Nov. 17, 1936.　　　C. L. WHITE　　　2,060,917
BRAKE
Filed Oct. 1, 1930

INVENTOR.
CLYDE L. WHITE
BY
ATTORNEY

Patented Nov. 17, 1936

2,060,917

UNITED STATES PATENT OFFICE 2,060,917

BRAKE

Clyde L. White, South Bend, Ind., assignor to Bendix Brake Company, South Bend, Ind., a corporation of Illinois Application October 1, 1930, Serial No. 485,629

5 Claims. (Cl. 188—78)

This invention relates to brakes and more particularly to internal expanding brakes for motor vehicles.

An object of the invention is to provide a brake mechanism with an auxiliary operating member for actuating the braking element.

Another object of the invention is to provide the conventional duo servo brake with an auxiliary operating member which may be actuated to apply at least one of the braking elements.

A further object of the invention is to provide the conventional duo servo brake for a motor vehicle with an auxiliary operating member adapted to be actuated through a suitable source of power to apply at least one of the braking elements, so that the brakes may be effectively applied when the motor vehicle is parked.

A still further object of the invention is to provide a brake mechanism having an auxiliary operating member which is highly efficient in operation and yet of marked simplicity as a whole and in respect to its component parts, hence its manufacture may be economically facilitated both as regards to parts and their assembly.

Other objects of the invention will appear from the following description taken in connection with the drawing, which forms a part of this specification, and in which.

Figures 1, 2, 3, 4:
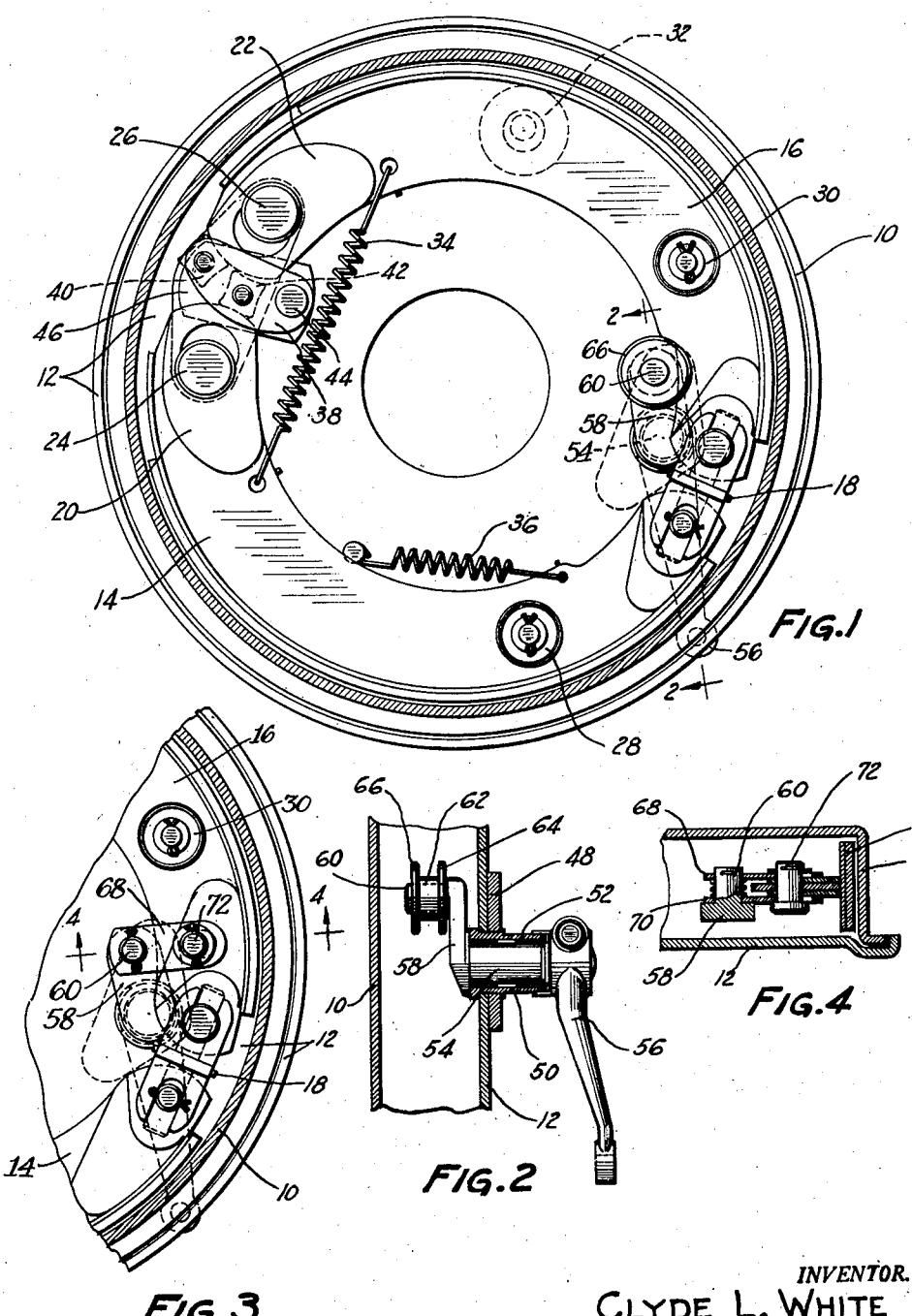
Figure 1 is a vertical sectional view of a brake taken just back of the head of the drum illustrating the braking elements in side elevation.
Figure 2 is a sectional view substantially on line 2—2, Figure 1.
Figure 3 is a fragmentary view illustrating a modified form of the invention.
Figure 4 is a section substantially on line 4—4, Figure 3.

The illustrated brake includes a rotatable drum 10 having associated therewith a fixed support or backing plate 12. Positioned for movement on the backing plate are interchangeable shoes 14 and 16 connected at their articulated ends by an adjusting member 18 and provided at their separable ends with reinforced rounded shoulders 20 and 22.

As shown, anchors 24 and 26 and suitable steady rests 28 and 30 are arranged on the fixed support or backing plate. The steady rests support the shoes and the separable reinforced ends of the shoes are slotted to receive the anchors, and engaging at least one of the shoes is an adjusting member 32 which retains the shoes when in an off position in spaced relation to the braking surface of the drum.

The shoes are connected by a return spring 34 and one of the shoes 14 is connected by a return spring 36 to the fixed support. These springs serve to return and retain the shoes in off position upon release of an operating member to be hereinafter described.

The operating member is positioned for movement between the separable ends of the shoes. This operating member comprises corresponding stampings 38 arranged on opposite sides of the respective separable ends of the shoes, and pivotally positioned between the stampings 38 are blocks 40 and 42 adapted to engage the rounded shoulders on the separable ends of the shoes. The operating member is pivoted as indicated at 44 to an operating lever 46. It is, of course, to be understood that other types of operating members may be employed.

Positioned on the backing plate adjacent the articulated ends of the shoes is a reinforcing plate 48 and positioned in an opening extending through the backing plate and the reinforcing plate is a sleeve 50. This sleeve has positioned therein a suitable bushing 52 and mounted for rotation within the bushing is a shaft 54. The shaft has secured on one end thereof an operating arm 56 having the conventional eye for the reception of a cable or linkage. The other end of the shaft has positioned thereon an arm 58 on which is formed a stub shaft 60. This stub shaft has positioned thereon for rotation a roller 62 flanked by disks 64 and 66. The roller is adapted to engage the web of one of the shoes and the disks are adapted to straddle the web so that the roller may be guided in its movement over the web.

Figures 3 and 4 illustrate a modified form of the invention wherein the stub shaft 60 carried on the arm 58 is connected by spaced links 68 and 70 to a pin 72 passing through a slot in the shoe or braking element 16. Other forms of connections or linkage between the arm 58 and the shoe or braking element may be employed with equally good effect.

In operation, for service application the operating member 38—46 forces the shoes apart, in the usual manner, against the drum. The present application relates mainly to the emergency application of the brake, when roller 62, or pin 72, forces the shoe 16 against the drum at the end opposite its anchor 26. Any movement of the drum 10 counterclockwise will now be resisted by the shoe 16, having a wrapping or self-energizing action, and the torque will be taken by the anchor 26. If the drum movement is clockwise, the drum acts on shoe 16 to force the shoe 14 against the drum, and the anchor 24 takes the torque.

It is to be understood that the forms of the invention herein shown and described are to be taken as preferred examples and that various changes in shape, size and arrangement of parts may be resorted to without departing from the spirit of the invention or the scope of the subjoined claims.

Having thus described the various features of the invention, what I claim as new and desire to secure by Letters Patent is:

1. A brake comprising, in combination with a drum, a pair of floating shoes connected by an adjustable compound floating pivot joint and arranged to have one shoe anchor when the drum is turning in one direction and to have the other shoe anchor when the drum is turning in the other direction, and a plurality of independently operable applying devices each arranged to apply at least one of said shoes whichever shoe anchors and one of which is arranged adjacent said joint.

2. A brake comprising, in combination with a drum, a pair of floating shoes connected by an adustable compound floating pivot joint and arranged to have one shoe anchor when the drum is turning in one direction and to have the other shoe anchor when the drum is turning in the other direction, and a plurality of independently operable applying devices adjacent opposite ends of the shoes and each arranged to apply at least one of said shoes whichever shoe anchors.

3. A shiftable-anchorage brake having a friction device provided with a stiffening web, and alternatively-operable applying devices therefor, one of which has a part in rolling thrust engagement with said web.

4. A brake comprising a drum, a pair of shoes within the drum having anchorage means for their ends on one side of the drum and the ends of which at the other side of the drum are adjustably connected and which are provided with stiffening webs, and applying means engaging the web of one of said shoes adjacent its adjustably-connected end and which applies said shoe.

5. A brake comprising a drum, a pair of shoes within the drum having anchorage means for their ends on one side of the drum and the ends of which at the other side of the drum are adjustably connected, and applying means engaging one of said shoes adjacent its adjustably-connected end and which applies said shoe.

CLYDE L. WHITE.